(No Model.) 3 Sheets—Sheet 1.
H. H. PATTEE.
ELECTRIC CURRENT TIME METER.
No. 498,021. Patented May 23, 1893.
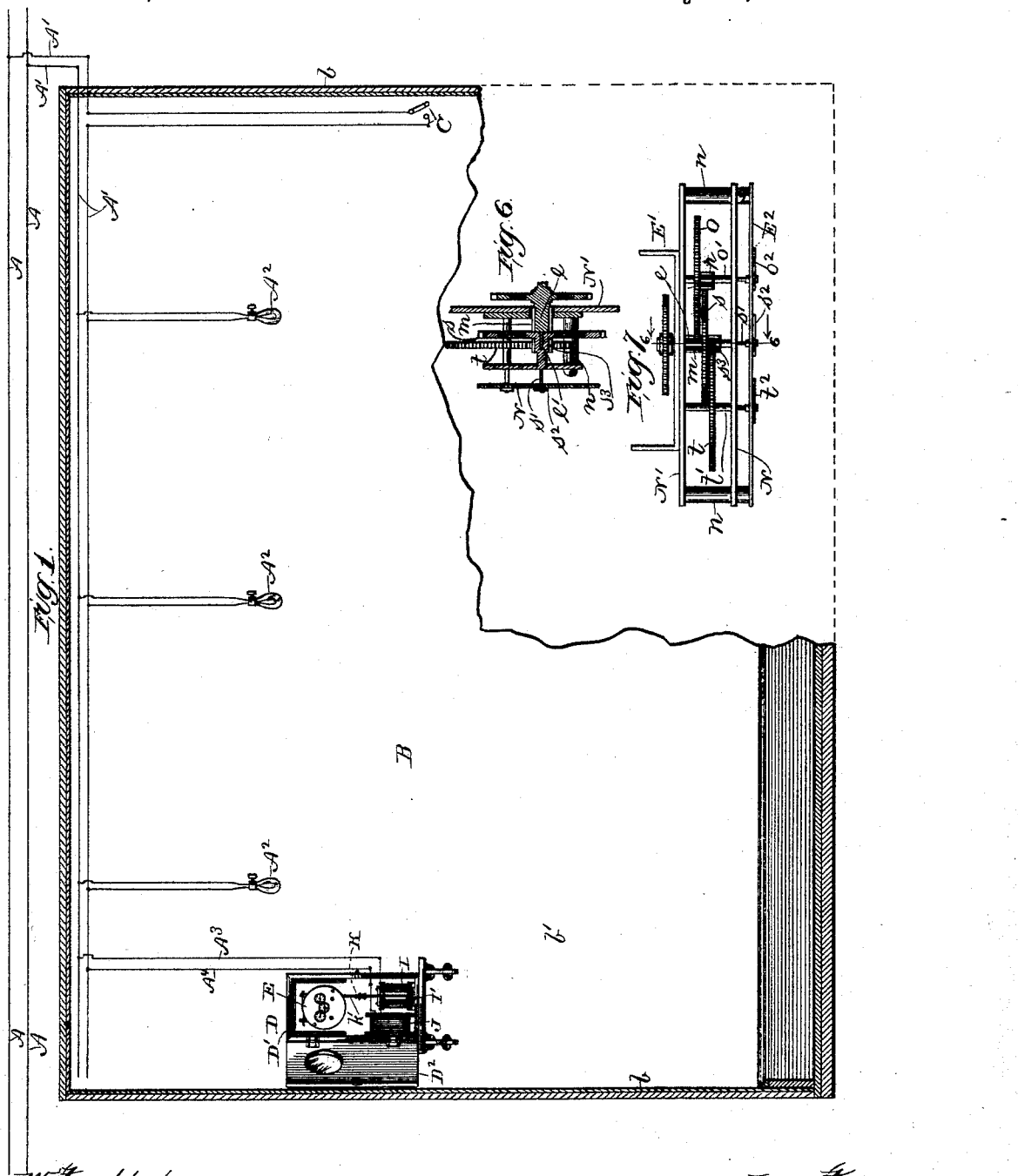
Witnesses.
Wm H Scott
H M Richards
Inventor:
H. H. Pattee
By W. B. Richards,
Atty.

(No Model.) 3 Sheets—Sheet 2.
H. H. PATTEE.
ELECTRIC CURRENT TIME METER.
No. 498,021. Patented May 23, 1893.
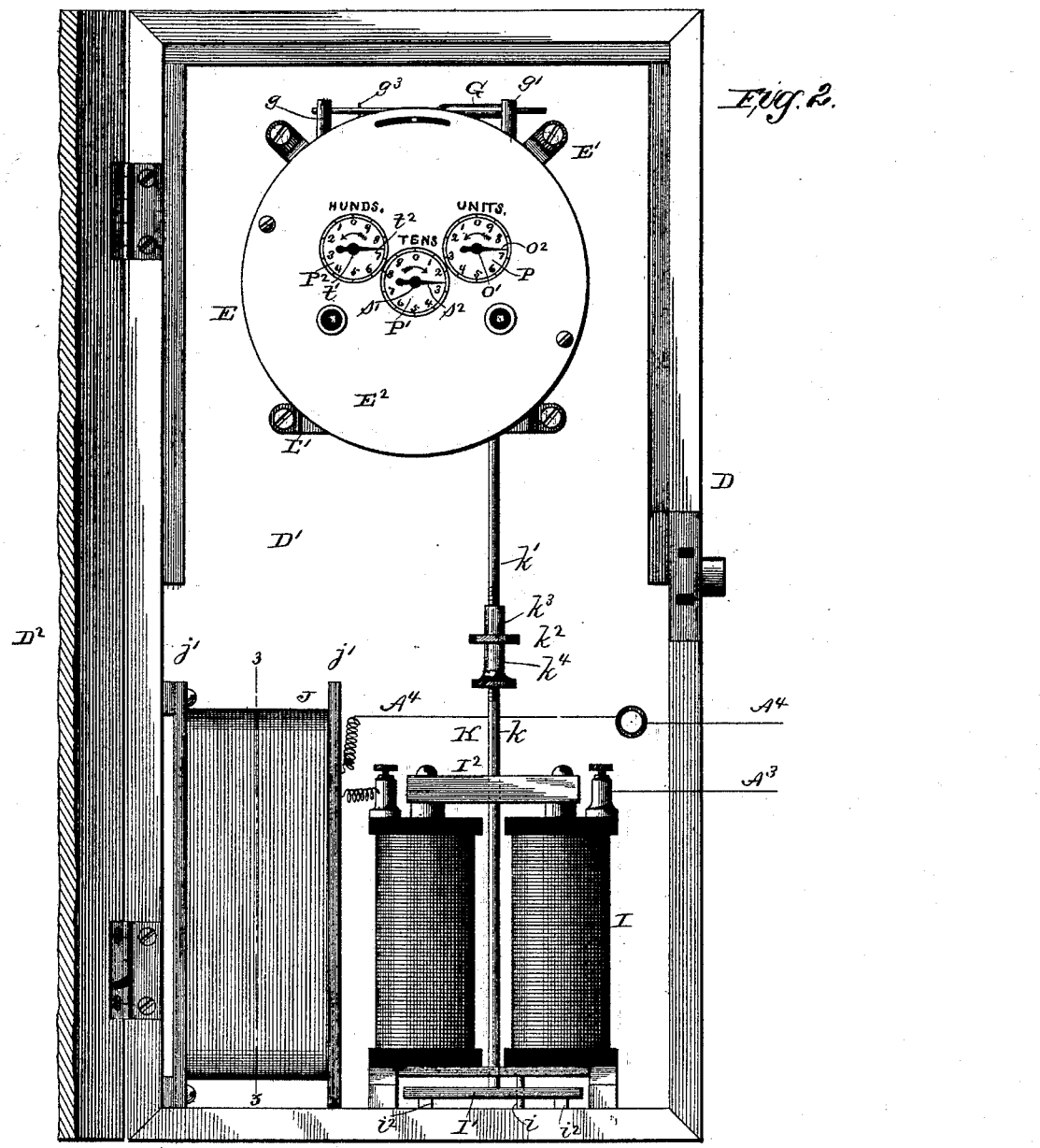
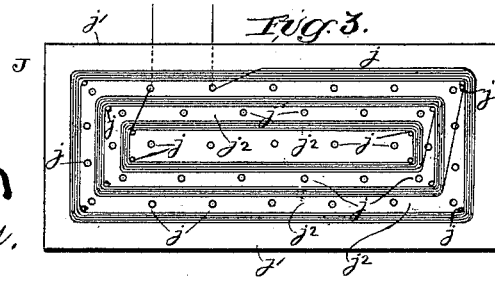

(No Model.) 3 Sheets—Sheet 3.
H. H. PATTEE.
ELECTRIC CURRENT TIME METER.
No. 498,021. Patented May 23, 1893.
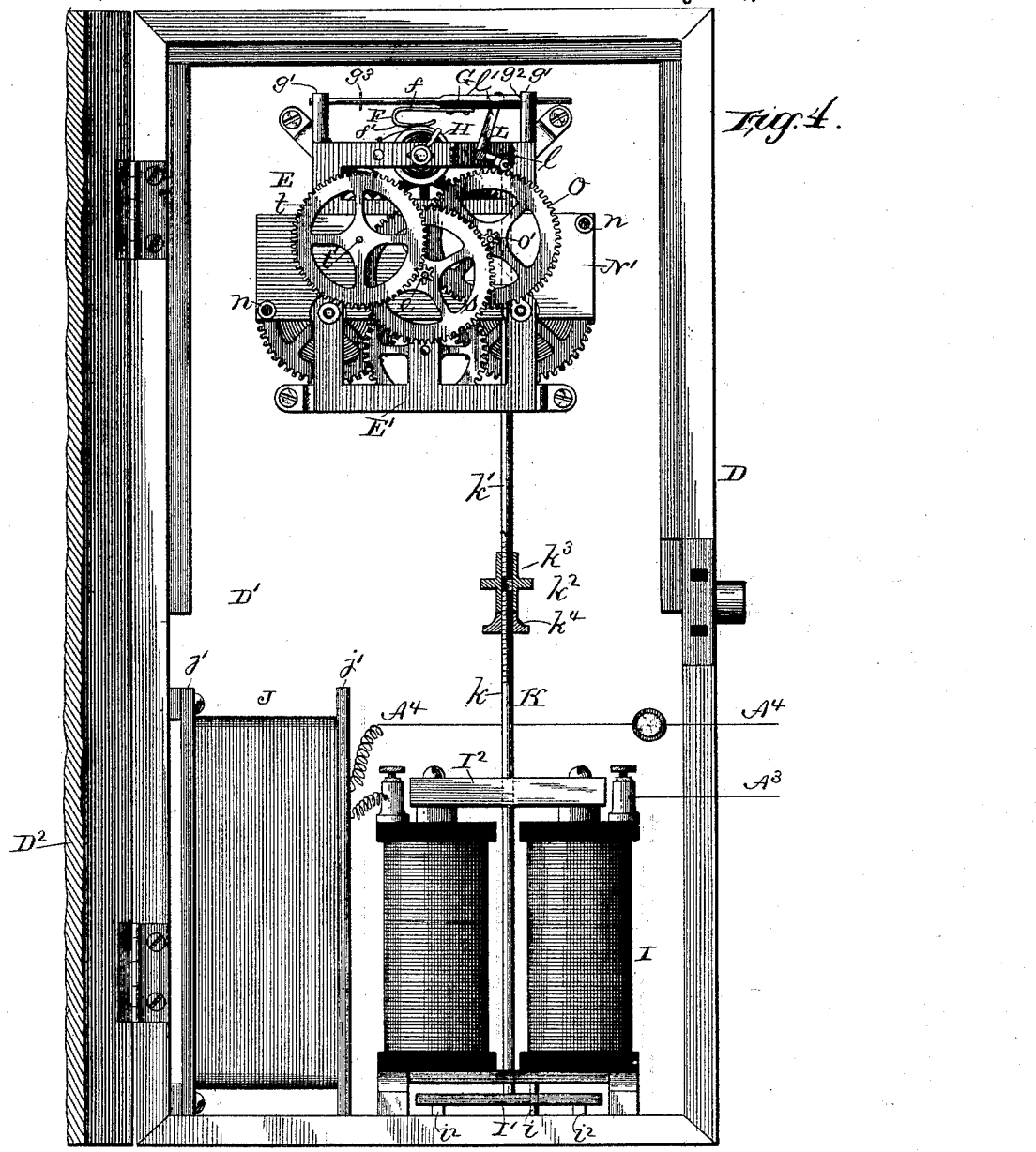
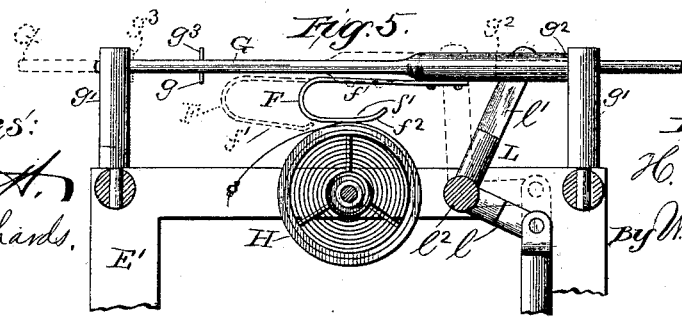

UNITED STATES PATENT OFFICE.

HENRY H. PATTEE, OF MONMOUTH, ILLINOIS.

ELECTRIC-CURRENT TIME-METER.

SPECIFICATION forming part of Letters Patent No. 498,021, dated May 23, 1893.

Application filed September 6, 1890. Serial No. 364,199. (No model.)

*To all whom it may concern:*

Be it known that I, HENRY H. PATTEE, a citizen of the United States, residing at Monmouth, in the county of Warren and State of Illinois, have invented certain new and useful Improvements in Electric-Current Time-Meters, of which the following is a specification.

This invention relates to electric meters, of that class which automatically measure and register or record the duration of the passage of electric currents through wires or conductors, or in other words, which measure and record or register the time during which an electric current or a successional series thereof are passing through a wire or conductor; and the invention relates more especially to that type of such electric meters in which a divided portion of the electric current, such as is used to operate an electric motor or motors, an electric lamp or lamps, or for other purposes, is also made to operate a mechanism, which mechanism acts as a brake or lock to stop an ordinary clock movement when the electric circuit is opened and the electric current thereby stopped, and to lock or hold the clock movement from running until the electric circuit is closed and the electric current is thereby again started to remove the brake or lock from the clock movement and thereby release said movement and permit it to run or operate while the electric current is passing, and in which the mechanism for recording the time during which the electric current is passing, or being used, is operated by, and starts and stops with the clock movement.

While my invention may be used to measure and record the time during which an electric current or successional series of electric currents are passing over or through an electric current conductor, when such conductor and the electric current which it carries are adapted and applied to operate an electric motor or motors, an electric lamp or lamps, or for other uses and purposes, I have shown it, and describe it herein as adapted and used for the purpose of furnishing means for measuring and recording the time during which a single lamp or separate groups of incandescent electric lamps have each lamp or group of lamps been lighted by the divisional portion of a main electric current which operates said lamp or group of lamps, whereby readings may be made at given periods, say of one month, week, or other desired period, showing the sum of the times that such electric lamp or lamps have been used during said period, in any particular building, room, or other place lighted by a lamp or lamps connected with one branch of an electric circuit.

The novel means employed in carrying out the foregoing recited objects and purposes of my invention, as adapted for measuring and recording the duration of electric currents over branches of electric conductors, are hereinafter described, and the combinations and constructions thereof in which the invention consists are made the subject matter of the claims hereto appended.

The preferred construction of parts and arrangements thereof are illustrated in the accompanying drawings, in which—

Figure 1 is an elevation of part of the main circuit wires or conductors in an ordinary system of electric lighting apparatus, of branch wires leading therefrom and provided with electric lamps, and of my electric meter, and a sectional elevation of a room or building in which the lamps are located, and to one wall of which the meter is fixed; Fig. 2, an enlarged elevation of the electric meter, shown with the door of its containing case open and partly broken away; Fig. 3, a sectional elevation of the resistance coil, in the line 3, 3, in Fig. 2; Fig. 4, same elevation as Fig. 2, except that in Fig. 4 by the omission of the clock movement face and cross bar behind it, the parts behind said parts are brought into view, and in this figure the coupling in the rod extending from the armature to the brake is shown in sectional elevation; Fig. 5, an enlarged elevation of the balance wheel of the clock movement, its support, and of the parts of the stopping and starting mechanism adjacent thereto; Fig. 6, a sectional elevation in the line 6, 6, in Fig. 7; Fig. 7, a plan of the intermeshing gear wheels, which receive motion from the clock movement, and transmit motion to the recording indices, plan of a portion of the clock movement, and supporting parts for both.

The reference letters used indicate respectively the same part in the different figures of the drawings, and a dot line reference letter indicates a part in dot line which in full line form is indicated by the same reference letter made in full lines.

The parts of cables or main conductor wires, A, shown in the drawings, may be cables or main conductors of any ordinary kind, extending from any ordinary dynamo electric machine or machines (not shown), or from any suitable generator of electric currents. At Fig. 1 I have shown wires A', connected with the main wires or conductors A in an ordinary way, and which extending therefrom constitute an ordinary branch or division of the main circuit. The branch wires A' as shown, extend into a room B, two of the walls, $d$, of which are shown in section, and one wall, $b'$, in elevation. The wires A' are provided with a switch C, which is opened and closed to open and close the circuit, in an ordinary manner.

In the drawings I have shown three incandescent electric lamps $A^2$, connected with the wires A' in an ordinary manner, but it will be understood that any number of lamps may be used that will be practical. The wires A' are shown as disconnected at their distal ends, to provide for extensions to other rooms or places, or for sub-divisions into subordinate branches, as may be desired or required for lighting purposes, or for other purposes.

The operative parts of the meter D are assembled and mounted in a suitable case D', which has an ordinary door $D^2$. The case D', as shown at Fig. 1, is fixed to the wall $b'$ of the room B, but may be fixed in any suitable location where the wires A' can be connected with the meter as hereinafter described. The clock movement E shown in the drawings, is an ordinary spring movement, but any other suitable time movement or train may be used if preferred, and is preferably located in and fixed to the upper part of the case D', as shown, but may be located in any other part thereof if preferred. A brake F is mounted in the case D, and is provided with a brake shoe F' which is formed of a U-shaped plate of spring metal, one end or arm $f$ of which is preferably extended and riveted or otherwise fixed to a sliding brake carrying bar G, which is carried in bearings in suitable posts $g$, $g'$, in which bearings it can slide back and forth endwise of itself to an extent limited in one direction by the shoulder $g^2$ on the shaft G coming in contact with the post $g'$, and in the opposite direction by the radial pins $g^3$ which project from the shaft G coming in contact with the post $g$. The brake shoe F' is so located that its shorter arm $f'$ will rest with a yielding spring pressure on and in frictional contact with the rim of the balance wheel H of the clock, when the brake shoe and the sliding brake bar are at the limit of their throw in one direction, as shown by full lines at Figs. 4 and 5, and will be free from said balance wheel when the brake bar and shoe are at the limit of their throw in an opposite direction, as shown by dotted lines at Fig. 5. The shorter arm $f'$ of the brake shoe is preferably bent or curved at $f^2$ near its outer end, as shown, to facilitate its movement into contact with the balance wheel H, of the clock movement, and also to facilitate its movement and release therefrom.

An ordinary electro-magnet I and a resistance coil J are fixed in the case D', and a conductor or wire $A^3$ extends from one of the wires A' to the wire coils of the magnet I, and thence to the wire coils of the resistance coil J, from which a wire $A^4$ extends to the other wire A', and thus completes a circuit of the wires $A^3$ $A^4$ through the electro magnet and resistance coil. One main object of the electro magnet, and the entire object of the auxiliary resistance coil when used therewith as in my improvement, is to increase the resistance to such an extent as to reduce the ampères of the electric current that may pass through the wires $A^3$ $A^4$ to the minimum flow necessary merely to operate the brake mechanism of the meter. The size of the wire, its material, and its convolutions on the cores of the electro-magnet can be such as to produce sufficient ohms of resistance to the passage of the electric current without an auxiliary resistance medium, or coil, but I have found by experience that an electro-magnet so constructed as to offer such great resistance when applied to such uses and purposes as herein contemplated, will heat to an objectionable degree, hence I prefer using an auxiliary resistance medium in connection with the electro-magnet. A preferred auxiliary resistance medium is shown at Fig. 3, consisting of a resistance coil, in which the wires are wound or coiled on pins $j$, which pins are fixed in frame plates $j'$, and located as shown at Fig. 3, or in any ordinary manner, which will permit the passage of air through open spaces $j^2$ between the series of coils of the wire, for the purpose of preventing it heating to any objectionable extent.

By using the resistance coil, as shown and described, and of such wire as is best adapted for the purpose, only the passage of the very small amount of electric current will be permitted, which is sufficient to operate the brake mechanism of the meter, and an electro-magnet may be used not having such resistance as will cause it to become heated.

It will be evident to any person skilled in the art to which this invention appertains, that various kinds of resistance coils, or resistance mediums of any suitable kind may be used as auxiliary to the electro-magnet, which mediums or coils have sufficient and proper ohms of resistance to the passage of the electric current.

A rod K is fixed to and extends upwardly from the armature I' of the electro magnet I, and passing through suitable bearings in the supporting frame of the magnet and through the back armature or yoke $I^2$, in which bearings it slides lengthwise of itself with the movements of the armature I' to and from the electro-magnet; it also serves to hold the armature in proper alignment with the cores or poles of said magnet. Other means, however, may be used, if preferred, for aligning the armature properly, such as a fixed guide pin, $i$, which passes loosely through the armature, and while permitting the armature to move up and down freely, at the same time guides it properly. The upper end of the rod K is pivotally connected with one arm $l$ of an elbow-lever L, the other arm $l'$ of which passes through a slot in the sliding brake-bar G. The elbow-lever L is pivotally mounted at $l^2$ on the clock-frame. To provide means for adjusting the rod K to proper lengths to suit different adjustments relatively of the clock and the electro-magnet, and for the removal and replacement of either the clock or the electro-magnet, without removal of the other, I have shown the rod K as formed in two parts $k\ k'$, united by a coupling $k^2$, (see Fig. 4,) in which a threaded sleeve $k^3$ is used to unite the adjacent threaded ends of the parts $k\ k'$, and is held in place after adjustment by a jam-nut $k^4$, which screws upon the part $k$. To properly adjust the rods $k\ k'$ the part $k$ should be drawn down as far as permitted by the shoulders $g^2$ striking the post $g'$ and the part $k'$ be lowered until the armature $I'$ comes in contact with the fixed blocks $i^2$, which limit its downward movement, when the sleeve $k^3$ may then be screwed into place on the adjacent ends of said parts, to fix and hold them in such positions as will give the proper length to the rod K.

When the switch C is open, as shown at Fig. 1, there being no electric current through the electro-magnet I, the armature $I'$ will remain free from the electro-magnet and in its lower position, as shown by full lines in the drawings, and in this position will, through the instrumentality of the rod K, elbow lever L and sliding brake-bar G, hold the brake shoe F in frictional contact with the balance wheel H, and thereby lock or hold it and prevent the clock running or operating while the brake-shoe is in contact with the balance wheel, as described. When the switch C, is closed to establish an electric current through the wires $A'$, and to operate the lamps, or other devices that may be operated by the electric current, a portion of said current, as permitted by the resistance of the electro-magnet and the resistance medium, as hereinbefore described, will pass through the electro-magnet and resistance coil, and the armature $I'$ be attracted or drawn upwardly to the poles of the magnet, thereby raising the rod K, swinging the elbow-lever L, sliding the brake bar G, and moving the brake-shoe F away from the balance wheel H, and into the position shown by dotted lines at Fig. 5. While the switch C is closed and the lamps using the electric current, the armature will be held as last described, and the brake-shoe be thereby held free from the balance wheel, to permit the clock movement to run or operate until the switch C is opened and the electric current broken, when the armature dropping will lower the rod K, swing the elbow lever L, slide the brake bar G, and thus bring the brake shoe into contact with the balance wheel, and arrest the oscillations thereof, and thereby stop the clock from running or operating, and so hold it from operating, as hereinbefore described. The brake shoe, curved upwardly at its point, as shown, will slide freely onto and off from the balance wheel, and the bar G, sliding as it does, parallel to a tangential plane with reference to the balance wheel, will necessarily give the brake shoe a movement tangential with reference to said balance wheel, by means of which the spring pressure of the brake shoe on the balance wheel will be gradually increased from its minimum pressure as said brake shoe slides into position over the balance wheel to its maximum pressure or pressure necessary to arrest the motion of the balance wheel, and thereby arrest the operation of the clock movement gradually, and prevent injury to its train of mechanism or any part thereof, as would result from suddenly arresting its movements. My brake shoe thus not only presses lightly as it begins to act on the balance wheel, and with an increasing force as it is applied thereto, but its greatest pressure is also when most required, that is: when it is in its position resting on the balance wheel to hold the clock from running or operating. The brake shoe in sliding away from the balance wheel to release it, will by its frictional contact therewith give the balance wheel a partial rotation, and thus insure the immediate and certain starting of the clock when the brake shoe is removed from the balance wheel.

The ordinary center post $e$ of the clock movement is extended and has fixed upon its extended end a spur pinion $m$ which rotates once an hour with the center post and imparts movement to the other parts of the train of mechanism of the counter or register proper. The shafts which carry the intermeshing gear wheels of the register are journaled in plates $N\ N'$, which are supported in front of the clock movement frame, $E'$, and in rear of the clock movement face plate $E^2$. A gear wheel O fixed on a shaft $o'$ intermeshes with the pinion $m$, and having ten times as many cogs or teeth as the pinion $m$ will be rotated by said pinion once in ten hours, and thus rotate the index finger or pointer $o^2$ that is carried on the outer end of the shaft $o'$ in front of a dial P on the face plate $E^2$, which dial is graduated or marked circularly into ten regular intervals, (see Fig. 2,) and on which each revolution of the pointer $o^2$ will register or indicate ten hours of time that the clock movement has been running, and hence will indicate or register severally and collectively ten hours that the electro-magnet has been energized and that the lamp or lamps have been lighted and in use. A pinion $r$ fixed upon the shaft $o'$ intermeshes with a gear wheel $s$ which is journaled upon a short stub-axle $e'$, (see Fig. 6,) that projects from the center post $e$, and the wheel $s$ having ten times as many cogs or teeth as pinion $r$ is given a complete rotation by ten rotations of the pinion $r$. The shaft $s'$ to which the wheel $s$ is fixed, is extended and carries on its outer end a pointer or index finger $s^2$, in front of a dial $P'$ on the clock movement face $E^2$, which dial is circularly graduated into ten regular intervals. The pointer $s^2$ being rotated by and with the wheel $s$ will indicate and register by each division of the graduated circle on the dial $P'$ an entire rotation of the pointer $o^2$, or ten hours, hence an entire rotation of the pointer $s^2$ will register or point out on the dial $P'$ one hundred hours that the clock has run. The wheel $t$ gears with a pinion $s^3$ which is fixed to and rotates with the shaft $s'$ to which the wheel $s$ is fixed. The wheel $t$ has ten times as many cogs as the pinion $s^3$, and hence has one complete rotation given it by ten complete rotations of the pinion $s^3$. The shaft $t'$ of the wheel $t$ carries a pointer $t^2$ on its outer end, and in front of a circularly graduated dial $P^2$ on the clock movement face $E^2$. The pointer $t^2$ is thus given ten rotations to each rotation of the pointer $s^2$, and hence at each division of the dial $P^2$ indicates a complete rotation of the pointer $s^2$, and a complete rotation of the pointer $t^2$ will indicate ten rotations of the pointer $s^2$, and indicate or show that the clock movement has run or operated one thousand hours. Readings are taken from the dials $P$, $P'$, $P^2$ in an ordinary manner, that does not require description here, and any reading or record shown or indicated by the respective pointers on said dials while it shows the number of hours that the clock movement has operated, shows also thereby the number of hours that the electric current has been used in lighting the lamps or for other purposes. An eight day clock movement will ordinarily run long enough to permit not taking the readings of the meter oftener than once per month, and when the readings are taken the clock movement may be rewound. A clock movement that will run longer may be used if preferred. The operations of my electric-current time-meter will be understood from the foregoing description.

I have shown and described herein that mode of carrying out the invention made by me which I have thus far devised and put into practical operation, and which is well adapted to the type of machine alluded to, that I have heretofore devised and am putting into use; but I desire to be understood as considering the scope of my invention as covering not only an auxiliary resistance coil of the type shown, when used in combination with an electro-magnet substantially as I have shown and described it used; but also any resistance medium when used as an auxiliary, or aid to the electro-magnet, and in the combination herein described, whether for the purpose of measuring the duration of electric currents, in use for lighting one, or a group or series of electric lamps, supplying propulsive energy for a motor, or for other purposes. Neither do I desire to be understood as considering the scope of my invention limited by any means to its use alone on a branch or branches of a main electric circuit, as it will be evident to any person skilled in such matters, that the invention may be adapted to a main circuit by simply fitting and constructing the parts for such use, in an apparent manner.

Having thus described my invention, what I claim as new, and desire to secure by Letters Patent, is—

1. In a meter for measuring and registering the duration of electric currents, the combination with an electro-magnet, its armature, a clock movement, and a time register in gear with said clock movement, a rod connected with the armature at one end, an elbow-lever, to which the other end of said rod is pivoted, a sliding bar which is adapted to be operated by said elbow-lever, a yielding brake-shoe carried by said sliding bar, which slides into and out of frictional contact with the balance-wheel of the clock movement, substantially as set forth.

2. In combination, the electro magnet I, its armature I', a rod K formed of two parts, $k$ and $k'$, adjustably connected by a sleeve nut, a clock movement and time registering movement in gear with each other, elbow lever L, sliding bar G, and spring brake shoe F adapted to slide into and out of contact with the balance wheel of the clock movement, substantially as and for the purpose specified.

In testimony whereof I affix my signature in presence of two witnesses.

HENRY H. PATTEE.

Witnesses:
R. C. HUNT,
CHARLES BROWN.